United States Patent
Little

(10) Patent No.: US 11,271,839 B2
(45) Date of Patent: Mar. 8, 2022

(54) DYNAMIC ASYNCHRONOUS COMMUNICATION MANAGEMENT

(71) Applicant: Red Hat, Inc., Raleigh, NC (US)

(72) Inventor: Mark Cameron Little, Ebchester (GB)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 16/173,402

(22) Filed: Oct. 29, 2018

(65) Prior Publication Data
US 2019/0068471 A1    Feb. 28, 2019

Related U.S. Application Data

(63) Continuation of application No. 14/619,389, filed on Feb. 11, 2015, now Pat. No. 10,116,543.

(51) Int. Cl.
| | | |
|---|---|---|
| *H04L 12/26* | (2006.01) | |
| *G06F 11/07* | (2006.01) | |
| *H04L 43/0864* | (2022.01) | |
| *G06F 11/34* | (2006.01) | |

(52) U.S. Cl.
CPC ...... *H04L 43/0864* (2013.01); *G06F 11/0715* (2013.01); *G06F 11/0757* (2013.01); *G06F 11/3409* (2013.01); *G06F 11/3419* (2013.01)

(58) Field of Classification Search
CPC ............ H04L 43/0864; G06F 11/0715; G06F 11/3409; G06F 11/3419
USPC ...................................................... 709/224
See application file for complete search history.

(56) References Cited

U.S. PATENT DOCUMENTS

| | | | |
|---|---|---|---|
| 5,812,768 A | 9/1998 | Page et al. | |
| 5,913,060 A * | 6/1999 | Discavage | G06F 9/524 719/310 |
| 6,026,424 A * | 2/2000 | Circenis | G06F 9/54 718/104 |
| 6,496,850 B1 | 12/2002 | Bowman-Amuah | |
| 7,493,394 B2 | 2/2009 | Zavalkovsky et al. | |
| 8,447,859 B2 * | 5/2013 | Bobak | G06F 9/5072 709/226 |
| 8,881,169 B2 * | 11/2014 | Abe | G06F 11/3404 714/15 |

(Continued)

OTHER PUBLICATIONS

Nightingale et al., "Speculative Execution in a Distributed File System" Oct. 23-26, 2005, Department of Electrical Engineering and Computer Science University of Michigan, htto://www.cs.berkelev.edu/~brewer/cs262/soeculator-niahtinaale.odf.

(Continued)

*Primary Examiner* — Tauqir Hussain
(74) *Attorney, Agent, or Firm* — Haynes and Boone, LLP

(57) ABSTRACT

A method for performing asynchronous communication includes executing a thread, by a computing system, the thread comprising an instruction to send a message to a remote system under a current set of conditions. The method further includes waiting, by the computing system for a response to the message for a predetermined amount of time, wherein the predetermined amount of time is calculated based on historical data, wherein the historical data comprises one or more response times for respective one or more messages, wherein the one or more messages are associated with a set of conditions that correspond to the current set of conditions.

20 Claims, 6 Drawing Sheets

(56) References Cited

U.S. PATENT DOCUMENTS

| | | | | |
|---|---|---|---|---|
| 9,007,889 | B2* | 4/2015 | Kanda | H04L 43/0805 370/216 |
| 9,286,185 | B2* | 3/2016 | Ur | G06F 11/3466 |
| 2003/0061279 | A1 | 3/2003 | Llewellyn et al. | |
| 2006/0064481 | A1 | 3/2006 | Baron et al. | |
| 2008/0037880 | A1* | 2/2008 | Lai | H04N 19/172 382/232 |
| 2012/0297216 | A1* | 11/2012 | Olszewski | G06F 1/3206 713/320 |
| 2014/0214745 | A1 | 7/2014 | Walsh | |

OTHER PUBLICATIONS

Caniou et al., "High Performance Gridrpc Middleware", 2006, Universite de Lyon, LIP, CNRS-ENS-Lyon-UCBL-INRIA, France; National Institute of Advanced Science and Technology, 1-1-1 Umezono, Tsukuba, Ibaraki 305-8568, Japan ; Electrical Engineering and Computer Science Department, University of Tennessee, Knoxville, TN, USA, htto://icl.cs.utk.edu/oroiectsfiles/netsolve/oubs/aridroe.odf.

Prashant Shenoy, "CMPSCI 677 Operating Systems", Feb. 20, 2013, httn://lass.cs.umass.edu/~shenov/courses/sorina 13/lectures/notes/677 lec09.odf.

"Libxmlrpc client++", httg://xmlrgc-c.sourceforge.net/doc/libxmlrgc client++.html.

Fischer et al., "Impossilbity of Distributed Consensus with One Faulty Process" Apr. 1985, Journal of the Association for Computina Machinery, htto://cs-www.cs.vale.edu/homes/arvind/cs425/doc/fischer.odf.

Lamport, "Time, Clocks, and the Ordering of Events in a Distributed System", Oct. 1977, htto://research.microsoft.com/en-us/um/oeoole/lamoort/oubs/time-clocks.odf.

Little et al., "The University Student Registration System: A Case Study in Building a High-Availability Distributed Application Using General Purpose Components", 1999, Proceeding Advances in Distributed Systems, Advanced Distributed Computing: From Algorithms to Systems pp. 453-471, htto://dl.acm.ora/citation.cfm?id=726895.

Panzieri et al., "Rajdoot: A Remote Procedure Call Mechanism Supporting Orphan Detection and Killing", htto://csis.oace.edu/~marchese/CS865/Paoers/oanzieri .odf.

* cited by examiner

DYNAMIC ASYNCHRONOUS COMMUNICATION MANAGEMENT

The present application is a continuation of U.S. patent application Ser. No. 14/619,389 filed Feb. 11, 2015 and entitled "Dynamic Asynchronous Communication Management," the disclosure of which is hereby incorporated by reference in the entirety.

BACKGROUND

The present disclosure relates generally to distributed computing systems, and more particularly to methods and systems for improving the efficiency of asynchronous communication between systems.

Individual computing elements of distributed systems often utilize asynchronous communication methods when communicating with each other. Asynchronous communication can provide a number of benefits over synchronous communication. For example, asynchronous systems may perform other tasks after sending a message and before receiving the response. In other words, asynchronous systems do not have to be idle while waiting for a response to a message.

One challenge that arises with use of asynchronous systems is that it is difficult to detect failures. If a response is not received within a certain period of time, it is unknowable as to whether the response is simply delayed due to network traffic or whether there will be no response due to the responding device crashing or otherwise being unavailable. A typical technique for handling this situation is to use timeouts. Timeouts work by assuming that a response will not be received if it is not received during a specified amount of time. While use of timeouts can be helpful, it is desirable to find ways to improve the manner in which asynchronous systems communicate.

SUMMARY

A method performed by a computing system includes, executing a thread, the thread comprising an instruction to send a message to a remote system, after sending the message, allowing continued execution of the thread, after a first period of time, checking for a response to the message, and in response to determining that the response has not been received and that the first period of time is less than a predetermined amount of time, waiting for an additional period of time for the response. The predetermined amount of time is based on collected data associated with a set of conditions that correspond to a current set of conditions related to the remote system.

A method performed by a computing system includes, with the computing system, monitoring response times for a plurality of messages sent from the computing system to a remote system, the response times corresponding to an amount of time between sending that message and receiving a response to that message, associating with each of the plurality of messages, a set of conditions under which that message was sent, determining an expected time range for messages sent to the remote system, the expected time range being a function of the conditions, executing a thread, the thread comprising an instruction to send a first message to the remote system, after sending the first message, continuing execution of the thread, after a first period of time, checking for a response to the message, and in response to determining that the response has not been received and that the first period of time is less than a predetermined amount of time, waiting for an additional period of time for the response. The predetermined amount of time is based on the expected time range based on a current set of conditions.

A system includes a processor and a memory, the memory comprising machine readable instructions that when executed by the processor, cause the system to execute a thread, the thread comprising an instruction to send a message to a remote system, after sending the message, continuing execution of the thread, after a first period of time, checking for a response to the message, and in response to determining that the response has not been received and that the first period of time is less than a predetermined amount of time, waiting for an additional period of time for the response. The predetermined amount of time is based on collected data associated with a set of conditions that correspond to a current set of conditions related to the remote system.

Figure 1:
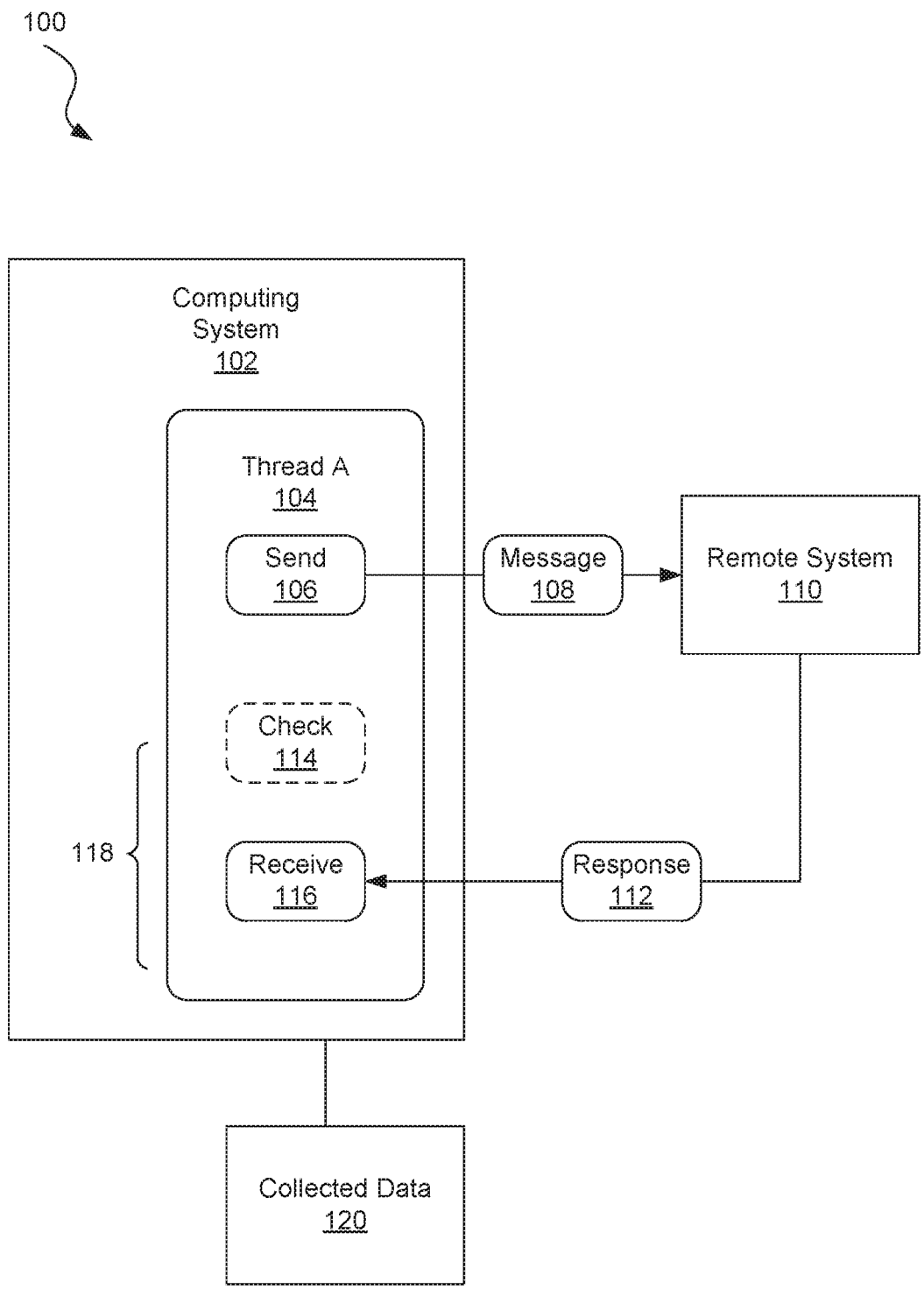
FIG. 1 is a diagram showing illustrative computing system that communicates with a remote system, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to find ways to improve the manner in which asynchronous systems communicate. Typically, in an asynchronous system, when a computing system in a distributed computing environment sends a message to another system, the thread that sends that message is not blocked. Thus, the thread continues to execute while it waits for a response to the message. At some later point in time, the thread checks to see if there has been an answer to the message. If not, then the application assumes that there will be no response because it can't wait forever for the response and there is no good mechanism to determine whether a response will eventually come. But, it may be that network traffic is heavy and so the response will take just a few seconds longer. Thus, the application may cause errors due to sending the same message multiple times.

According to principles described herein, a method for asynchronous communication management includes a dynamic approach that gives applications more information regarding how long a response should take based on accumulated historical data. Specifically, when a thread being processed by a computing system sends a message to another system, that thread is not blocked, and thus is allowed to continue execution. At some point in time, the thread checks to see if a response to that message has been received. If so, then execution continues as normal. But, if not, instead of assuming that a response will not come, the thread utilizes the historical data to determine an expected response time. If the expected response time has not yet elapsed, then the thread can wait an additional amount of time in accordance with the expected response time.

The historical data takes into account a variety of factors. Such factors may include the type of message and the type of service to which the message is being sent. The factors may also include the current network conditions or load on server systems that process the message and send the response. The historical data may thus provide a time range in which the response to a message is expected to be received under similar conditions.

FIG. 1 is a diagram showing illustrative computing system 102 that communicates with a remote system 110. According to the present example, the computing system 102 executes a thread 104 that sends a message 108 to the remote system 110. At some later point in time, the computing system 102 receives a response from the remote system 110.

In one example, the computing system 102 may be a node within a distributed computing system. In such a case, the remote system 110 may also be a node within the distributed computing system. The computing system 102 and the remote system 110 may each include one or more processors and a memory such as the system that will be described in more detail below in the text accompanying FIG. 6. In one example, the computing system 102 is a client system that communicates with a remote service. In such case, the remote system 110 may be a server such as a web server. The principles described herein may apply to other situations in which one computing system communicates with another in an asynchronous manner.

A thread 104 is a unit of program instructions that is scheduled for execution on a processor. Many processors have multithread capability and can thus execute multiple threads by time division multiplexing. Additionally, as some threads become blocked, the processor can execute other threads until the blocked thread becomes unblocked.

In the present example, the thread 104 includes an instruction 106 for sending a message 108 to the remote system 110. The message 108 may be a request for services. For example, the message 108 may include various parameters and other information that is to be processed by the remote system 110. The remote system 110 then returns the requested information as a response 112 to the requesting computing system 102.

After the message 108 is sent, the thread 104 is not blocked, and thus is allowed to continue execution. While the processor may switch to other threads and back, the thread 104 can continue execution as normal because it is not blocked. At some point in time, the thread 104 calls into the communication infrastructure to determine if a response has been received. Conventionally, if a response has not yet been received, the thread 104 assumes failure and acts accordingly, which in some cases may involve resending the message 108. But, according to principles described herein, the computing system 102 has access to a set of collected data 120 related to past response times for similar responses under similar conditions. Thus, if the expected time range has not yet elapsed, the computing system 102 can wait 118 for an additional period of time before assuming failure.

In one example, the computing system 100 is responsible for collecting the data 120. This may be done by monitoring the response times for multiple messages sent to various remote systems. Additionally, the computing system 102 determines the conditions such as network load, processor load of the remote system, and type of response. After a statistically relevant number of response times have been collected for various conditions, the computing system 102 can form an expected time range that is a function of a specified set of conditions. Thus, when the computing system 102 sends a new message, it can check the current conditions and consult the collected data to determine a response time based on the current conditions. The computing system 102 can also update the collected data by measuring the response time for the new message.

Figure 2:
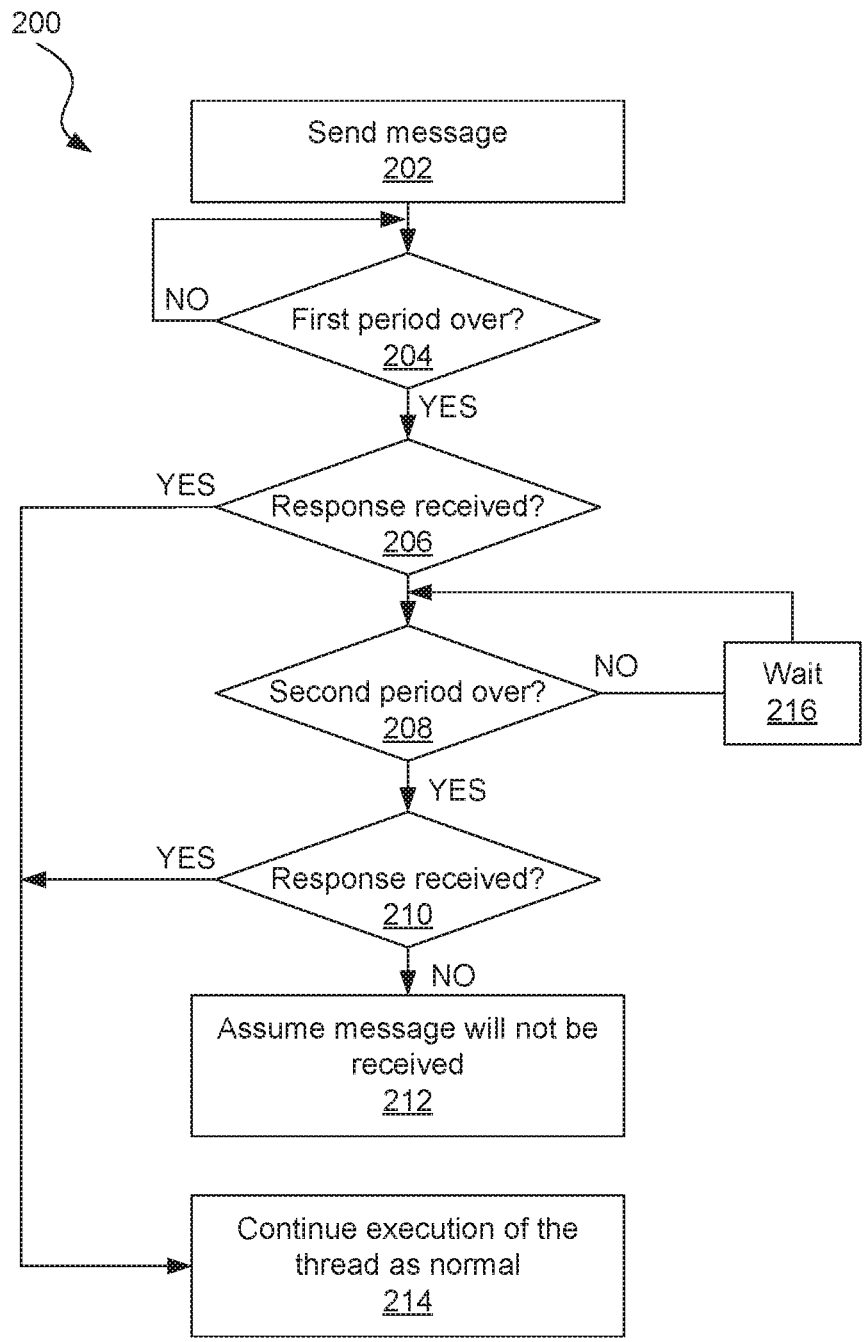
FIG. 2 is a flowchart showing an illustrative method for using dynamic asynchronous communication management, according to one example of principles described herein.

FIG. 2 is a flowchart showing an illustrative method for using dynamic asynchronous communication management. According to the present example, the method includes a step 202 for sending a message to a remote system. As described above, the thread that includes the send instruction is not blocked, and thus is allowed to execute. At step 204, it is determined whether a first period of time has elapsed. The first period of time may vary depending on the application. In one example, the first period of time is a standard timeout mechanism used in asynchronous systems. In one example, the first period of time represents a point at which the thread is not able to proceed without the response.

If the first period of time has not elapsed, then the thread continues unblocked and does not yet check for a response to the message. But, if the first period of time has elapsed, the thread calls into the communication infrastructure to see if a response to the sent message has been received at step 206. If the response has in fact arrived, then there is no issue. The thread can continue as normal at step 214. The thread may even complete if no further responses are needed for the thread and the thread finishes executing its instructions. But, if the response has not yet been received, then the method proceeds to step 208.

According to principles described herein, at step 208, if the response has not yet been received, then it is determined whether a second period of time has passed. The second period of time corresponds to an upper bound of a time range in which the response is expected to arrive. The expected response time is based on a historical data under conditions that are similar to the current conditions. For example, historical data can be collected that indicates that under a certain network load and a certain server load, then this type of request typically receives a response within 3-4 seconds.

If the second period has not yet elapsed, which in this example is four seconds, then the system will wait as indicated in step 216. During this waiting period, the system may respond in different ways based on the application. For example, if the thread cannot proceed without the response, then the thread can be blocked during this waiting period. If, however, the thread has other instructions that can be performed without waiting on the response, then the thread may be allowed to continue. During this time, the processor may switch to other threads as needed.

If the second period has elapsed, it is determined whether the response has been received at step 210. If the message has not been received, then it can be assumed that the response will not come, at step 212. The application associated with the thread can then handle the situation accordingly. If, however, the response has been received, then the method 200 proceeds to step 214 where execution of the thread continues as normal.

Figure 3A:
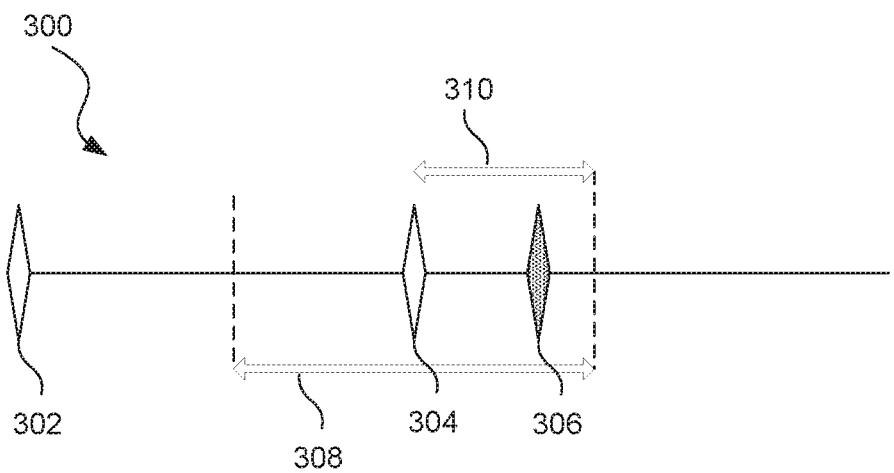
FIGS. 3A-3C are diagrams showing illustrative timing for reception of responses, according to one example of principles described herein.
Figure 3B:
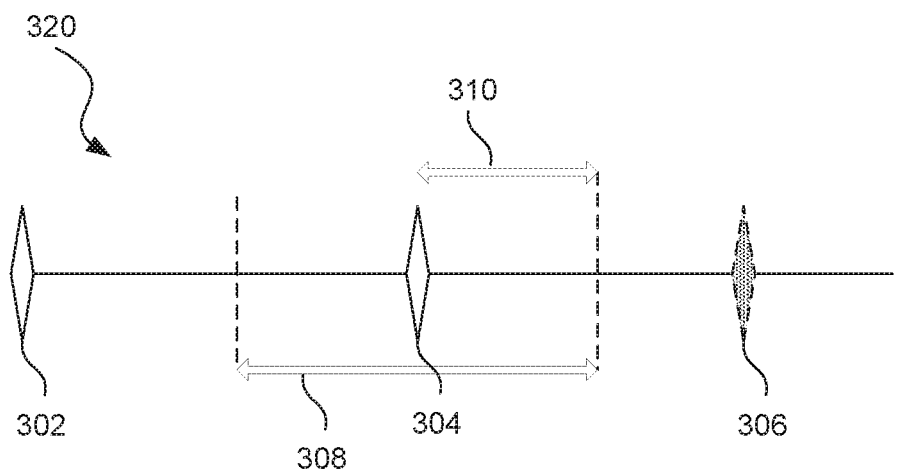
Figure 3C:
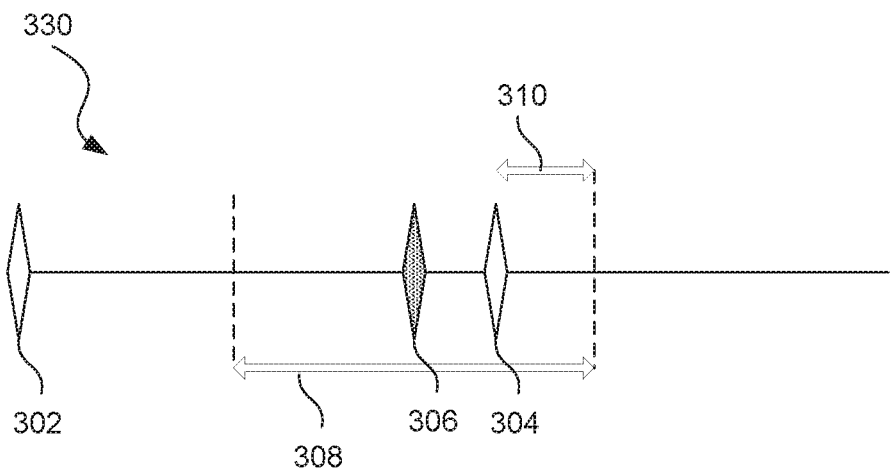

FIGS. 3A-3C are diagrams showing illustrative timing for reception of responses. FIG. 3A illustrates the case where the response is received after the first period of time but before the upper bound of the expected time. According to the present, the vertical axis represents time. Point 302 represents the point at which a message is sent to a remote system. Point 304 represents the end of the first period of time. As described above, the first period of time is the normal time at which the application checks to see if a response as done conventionally without the use of principles described herein. Point 306 represents the point in time at which a response to the sent message is received.

As described above, according to principles described herein, there is an expected range 308 at which a response should be received. To determine this range, the computing system determines the current conditions, such as network load, processor load (of the remote system to which a message is sent), and type of message. Other conditions can be considered as well. Using the current conditions, the system consults historical data that has been collected on similar responses under similar conditions. The historical data can provide an expected range based on such conditions.

In the present example, the first period of time elapses before the message is received. Thus, while a conventional system would assume failure at this point, the system that embodies principles described herein knows that the response may take longer based on current network conditions. Thus, the system waits for an additional period of time 310. The additional period of time brings the total time to the upper bound of the expected range 308. In this example, the response is received before the additional period of time 310 expires. Thus, because the system waited for this additional period of time, which is based on historical data, the system did not assume failure and the response was received as desired.

FIG. 3B is an example of a case where the response is received after the additional time expires. Such a situation may occur due to a spike in network traffic or a spike in processor load. In such case, the response still comes too late and the system has already assumed failure, even after waiting for the additional period of time. Because a system cannot know if a late response will ever arrive, the system has to assume at some point that a response will not come and continue accordingly.

FIG. 3C illustrates an example in which the response 306 is received before the first period of time 304 elapses. In such a case, the system does not have to wait for the additional period of time 310 because the response has already been received. Thus, the system can continue as normal.

Figure 4:
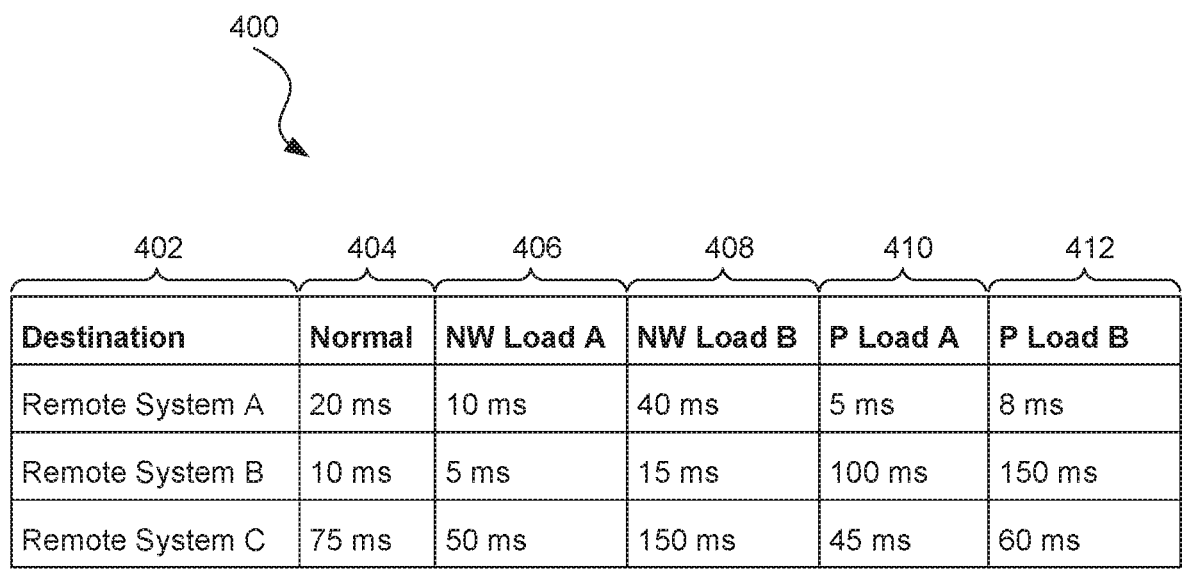
FIG. 4 is a table showing an illustrative collection of data used to estimate response times, according to one example of principles described herein.

FIG. 4 are tables showing an illustrative collection of data used to estimate response times. The collected data may be organized and utilized in a variety of different ways. According to the present example, the first column 402 corresponds to specific destinations to which messages have been sent in the past and for which the data has been collected. The second column 404 indicates an upper bound of a time range in which a response from the corresponding system should be received under normal circumstances. For example, a response to a message sent to remote system A should not take more than about 20 milliseconds. Likewise, a response to a message sent to remote system B should not take more than 10 milliseconds.

The third column 406 and the fourth column 408 indicate an amount of time that is added to the upper bound of the second column 404 under various network load conditions. Specifically, the third column 406 represents network load A and the fourth column 408 represents network load B. Various metrics may be used to measure a network load, such as how many packets are being transmitted within a specific time range. Network load A represents a first range of network loads and network load B represents a second range of network loads. While FIG. 4 lists only two ranges of network loads, practical embodiments may have more, narrower ranges of network loads. In the present example, under network load A, a response to a message sent to remote system A can be expected to take 10 milliseconds longer than usual. Under network load B, a response sent to remote system B can be expected to take 40 milliseconds longer than usual.

The fifth column 410 and the sixth column 412 indicate an amount of time that is added to the upper bound under various processor loads of the corresponding remote system. Specifically, the fifth column 410 represents an additional amount of time that is added to the upper bound under a processor load A and the sixth column 412 represents the amount of time that is added to the upper bound under a processor load B. Various metrics can be used to monitor a processor load. While FIG. 4 lists only two ranges of processor loads, practical embodiments may have more, narrower ranges of processor loads. In the present example, under processor load A for remote system A, a response to a message sent to remote system A is expected to take about 5 milliseconds longer than usual. Likewise, under processor load B for remote system A, a response to a message sent to remote system A is expected to take about 8 milliseconds longer than normal.

Other conditions that can affect the expected amount of time in which a response should be received may be used in accordance with principles described herein. For example, different types of messages that request different types of processing or different types of data can affect the time it takes for a response. A system embodying principles described herein may factor in multiple conditions to determine a final time range in which a response is expected. The upper bound in such a time range may be used as described above. Specifically, if the thread checks back in and a response has not yet been received, and the upper bound amount of time has not elapsed, then the system can wait for an additional period of time until the upper bound period of time expires.

Figure 5:
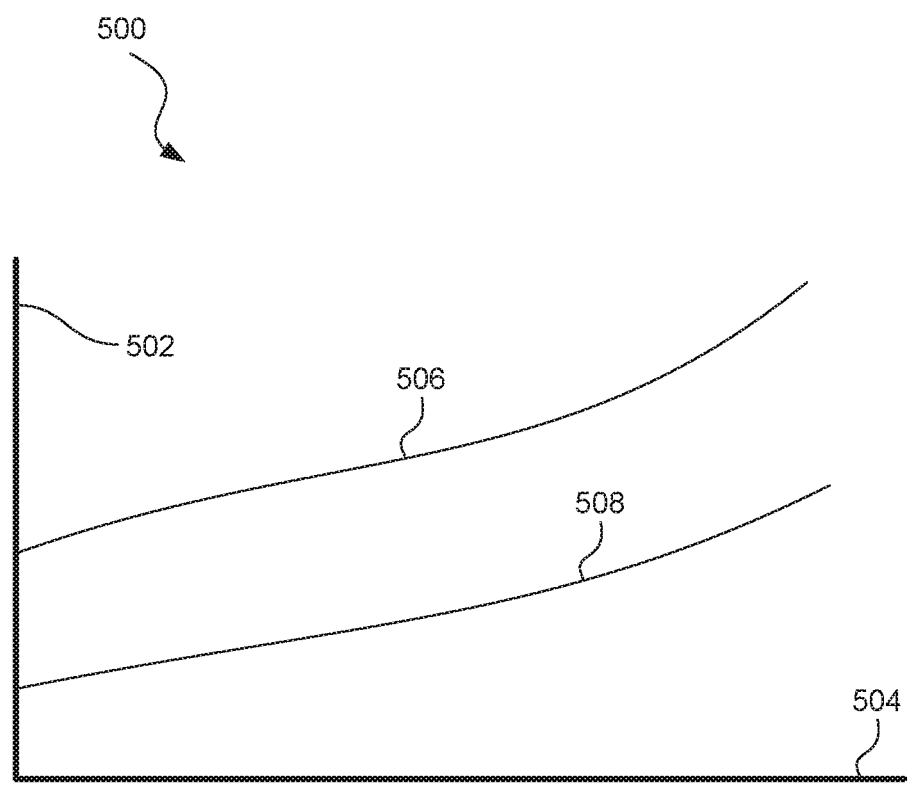
FIG. 5 is a graph showing an illustrative upper bound and lower bound for an expected response time as a function of a condition associated with the responding entity, according to one example of principles described herein.

FIG. 5 is a graph showing an illustrative upper bound and lower bound for an expected response time as a function of a condition associated with the responding entity. According to the present example, the vertical axis 502 represents an amount of time in which a response to a message is received. The horizontal axis 504 represents a condition, such as network load or processor load. Line 506 represents an upper bound of time and line 508 represents a lower bound.

Figure 6:
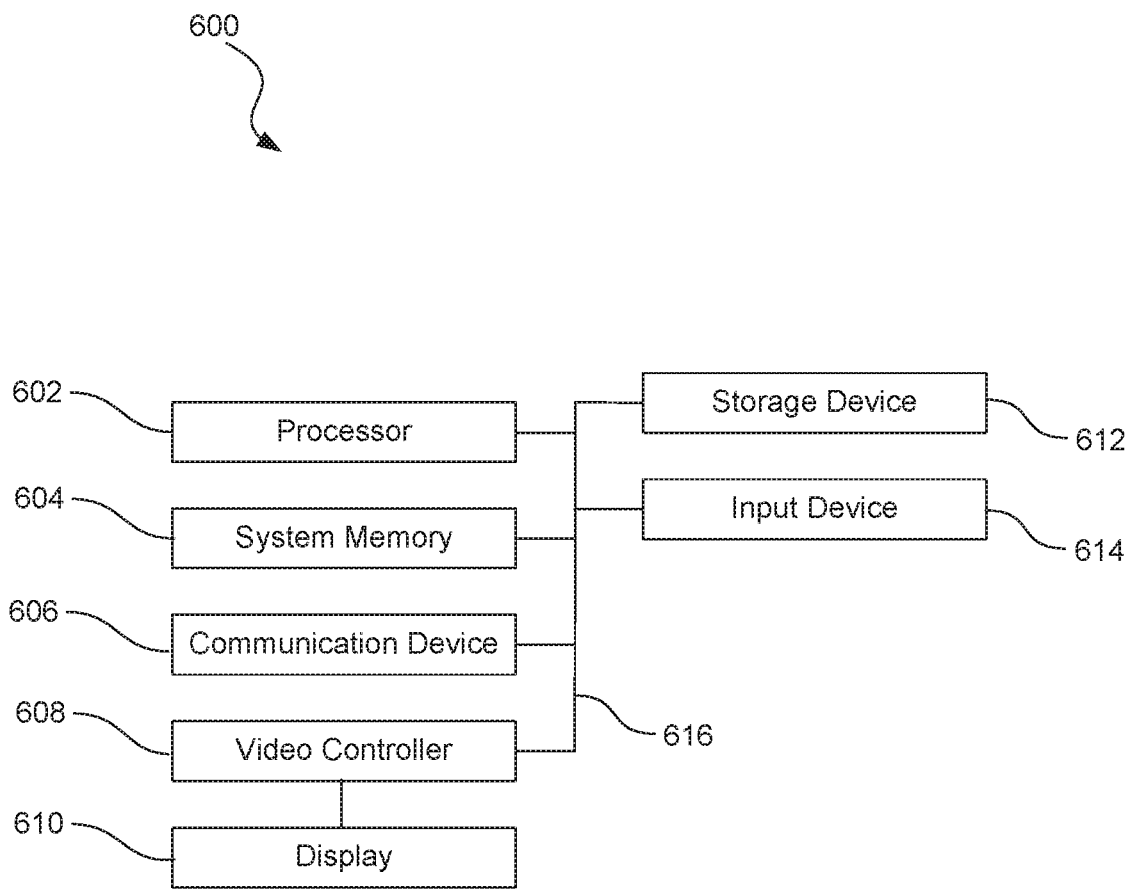
FIG. 6 is a diagram showing an illustrative computing system that may be used to perform asynchronous communication, according to one example of principles described herein.

According to the present example, as the condition grows in intensity, both the upper bound 506 and the lower bound 508 increase. For example, in the case that the condition represents network load, as the network load increases, the expected amount of time increases. The upper bound 506 and the lower bound 508 may be derived from historical data collected for actual response times in the past. For example, the upper bound may be within a, FIG. 6 is a diagram showing an illustrative computing system 600 that may be used to perform asynchronous communication. According to the present example, the computing system 600 may be the computing system (e.g. 102, FIG. 1) that sends a message to a different system. The computing system 600 may also be the remote system (e.g. 110, FIG. 1) that receives a message and sends a response.

According to the present example, the computing system 600 includes a processor 602, an input device 614, a storage device 612, a video controller 608, a system memory 604, a display 610, and a communication device 606, all of which are interconnected by one or more buses 616.

The storage device 612 may include a computer readable medium that can store data. The storage device 612 may include volatile memory storage devices such as Random Access Memory (RAM) as well as non-volatile memory storage devices such as solid state memory components. The computer readable medium may be a non-transitory tangible media.

In some examples, the communication device 606 may include a modem, network card, or any other device to enable the computing system 600 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 600 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 604, and/or any combination thereof, may be executed by a processor 602 to cause the processor 602 to carry out or implement in whole or in part the operation of the computing system 600, one or more of the methods. In some examples, such a processor 602 may execute the plurality of instructions in connection with a virtual computer system.

Some examples of processing systems described herein may include non-transitory, tangible, machine readable media that include executable code that when run by one or more processors (e.g., processor 602) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing asynchronous communication, the method comprising:
   determining a current set of conditions;
   executing a thread, by a computing system, the thread comprising an instruction to send a message to a remote system under the current set of conditions, the current set of conditions comprising a processor load of the remote system; and
   waiting, by the computing system for a response to the message for a predetermined amount of time, wherein the predetermined amount of time is calculated based on historical data, wherein the historical data comprises one or more response times for respective one or more messages, wherein the one or more messages are associated with a set of conditions that correspond to the current set of conditions.

2. The method of claim 1, further comprising, after the predetermined amount of time, checking for a response to the message.

3. The method of claim 2, further comprising, in response to determining that the response has not been received and that the predetermined amount of time is less than a predetermined amount of time, waiting for an additional period of time for the response.

4. The method of claim 1, wherein the historical data takes into account a type of service to which the message is being sent.

5. The method of claim 1, wherein the computing system is a node within a distributed computing system.

6. The method of claim 1, wherein the message is a request for services.

7. The method of claim 6, wherein the message includes parameters to be processed by the remote system.

8. The method of claim 1, further comprising, updating the historical data based on a measured amount of time between sending the message to the remote system and receiving a response from the remote system.

9. The method of claim 1, wherein the conditions comprise a network load of a network connecting the computing system to the remote system.

10. The method of claim 1, wherein the conditions comprise a type of the message.

11. A method performed by a computing system, the method comprising:
    with the computing system, monitoring response times for a plurality of messages sent from the computing system to a remote system, the response times corresponding to an amount of time between sending that message and receiving a response to that message;
    associating with each of the plurality of messages, a set of conditions under which that message was sent, wherein the set of conditions include a processor load of the remote system;
    determining an expected time range for messages sent to the remote system, the expected time range being a function of the conditions;
    sending, by the computing system, a first message to the remote system under a current set of conditions; and
    waiting for a response to the first message for a predetermined amount of time, wherein the predetermined amount of time is based on the expected time range based on the current set of conditions.

12. The method of claim 11, wherein the predetermined amount of time comprises an upper bound of the expected time range.

13. The method of claim 11, further comprising, updating the expected time range based on a measured amount of time between sending the message to the remote system and receiving a response from the remote system.

14. The method of claim 11, wherein the conditions comprise at least one of: a network load of a network connecting the computing system to the remote system and a processing load of the remote system.

15. The method of claim 11, wherein the conditions comprise a type of the first message.

16. The method of claim 11, further comprising, waiting for an additional period of time if the response is not received within the predetermined amount of time, wherein waiting for the additional period of time comprises:
    allowing continued execution of a thread associated with the first message; and
    checking, after the additional period of time, for a response to the first message.

17. The method of claim 11, further comprising, waiting for an additional period of time if the response is not received within the predetermined amount of time, wherein waiting for the additional period of time comprises:
    blocking a thread associated with the first message; and
    checking, after the additional period of time, for a response to the first message.

18. A method performed by a computing system, the method comprising:
    measuring a response time for each of a plurality of messages sent to a remote system;
    associating with each message, a set of conditions under which that message was sent, the set of conditions including a processor load of the remote system;
    sending, by a computing system a first message to the remote system under a current set of conditions; and
    waiting, by the computing system, for a response to the first message for a predetermined amount of time, wherein the predetermined amount of time is based on one or more response times for one or more of the plurality of messages that are associated with a first set of conditions that correspond to the current set of conditions.

19. The system of claim 18, wherein the one or more response times are for messages sent from the computing system to the remote system.

20. The system of claim 18, wherein the conditions comprise at least one of: a network load of a network connecting the computing system to the remote system, a processing load of the remote system, and a type of the first message.

* * * * *